United States Patent [19]
Kishimoto et al.

[11] 4,044,228
[45] Aug. 23, 1977

[54] ELECTRONIC CALCULATOR WITH PRINTER

[75] Inventors: Jyuji Kishimoto, Tokyo; Shigeru Toyomura, Kawasaka, both of Japan

[73] Assignee: Canon Kabushiki Kaisha, Tokyo, Japan

[21] Appl. No.: 608,019

[22] Filed: Aug. 26, 1975

[30] Foreign Application Priority Data

Aug. 30, 1974 Japan .............................. 49-99685
Aug. 30, 1974 Japan .............................. 49-99686

[51] Int. Cl.² .............. B41J 15/00; G06F 7/38; G01D 15/10; B41J 27/00
[52] U.S. Cl. .............. 235/61.9 A; 101/93.07; 197/133 R; 235/156; 346/76 R
[58] Field of Search ........... 235/156, 61.9 A, 61.9 R, 235/6; 197/133; 101/93.07, 228, 93.04, 11; 346/76 R; 340/172.5, 365 R; 178/42, 25

[56] References Cited
U.S. PATENT DOCUMENTS

| 2,310,418 | 2/1943 | Ghertzmann | 235/61.9 A |
| 2,616,365 | 11/1952 | Hicks | 101/93.07 |
| 3,296,961 | 1/1967 | Englund | 101/93.07 |
| 3,362,516 | 1/1968 | Scozzafava | 197/133 R |
| 3,520,459 | 7/1970 | McCrady | 235/61.9 A |
| 3,724,366 | 4/1973 | Murthy | 197/133 R |
| 3,787,886 | 1/1974 | McCrady | 346/76 R |
| 3,819,921 | 6/1974 | Kilby | 235/156 |
| 3,902,418 | 9/1975 | Morishita | 101/228 |

Primary Examiner—Robert M. Kilgore
Attorney, Agent, or Firm—Fitzpatrick, Cella, Harper & Scinto

[57] ABSTRACT

There is provided an electronic calculator with a printer which is capable of feeding any desired number of lines of a recording medium by keeping the operation execution instructin key depressed, thereby to realize both improvement of operability and elimination of the paper feed key. Also, even if said instruction key is not kept pushed down, it is possible to feed more than three lines of the recording medium by a one-tough operation. Further, by previously setting the quantity to be fed before operation, it is possible to automatically stop feed of the recording medium, which is fed by the key operation, upon feed of the predetermined quantity of the recording medium. Moreover, space feed may be automatically or artificially eliminated to improve the continuous printing output speed.

10 Claims, 12 Drawing Figures

FIG. 3A

NORMAL PRINTING

→ TIME

| KEY TOUCHING | 123× | 3= | | 628+ | |
|---|---|---|---|---|---|
| PRINTING | | 123× | 3=369* | SPACE LINE FEED | 628+ |

FIG. 3B

RAPID KEY TOUCHING

| KEY TOUCHING | 123× | 3= | 628+ | 223= | |
|---|---|---|---|---|---|
| PRINTING | | 123× | 3=369* | 628+ | 223= |

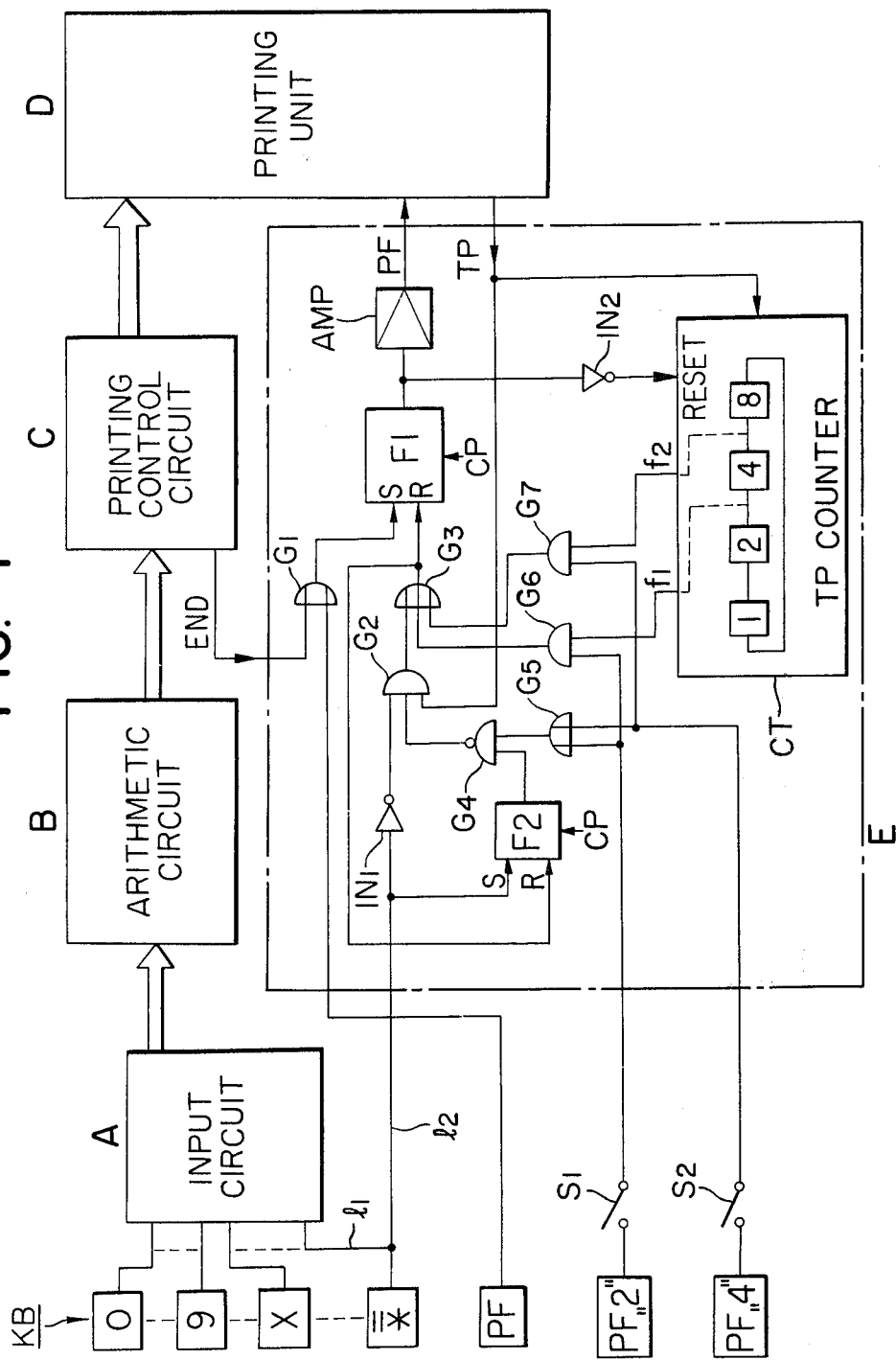

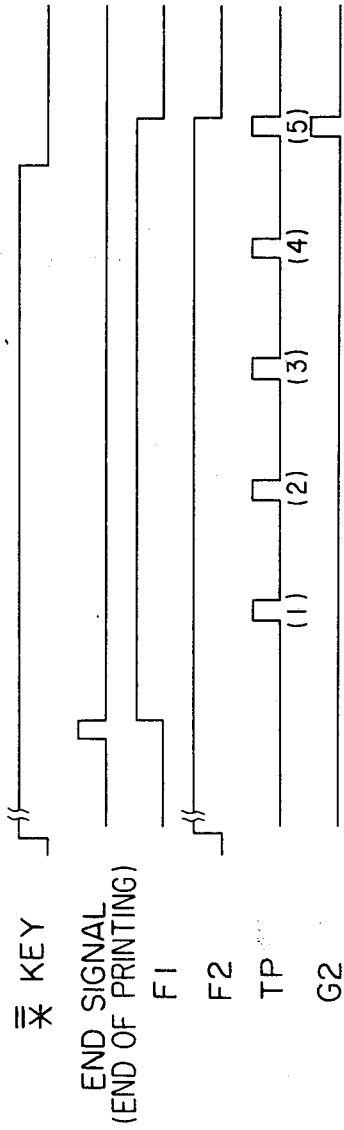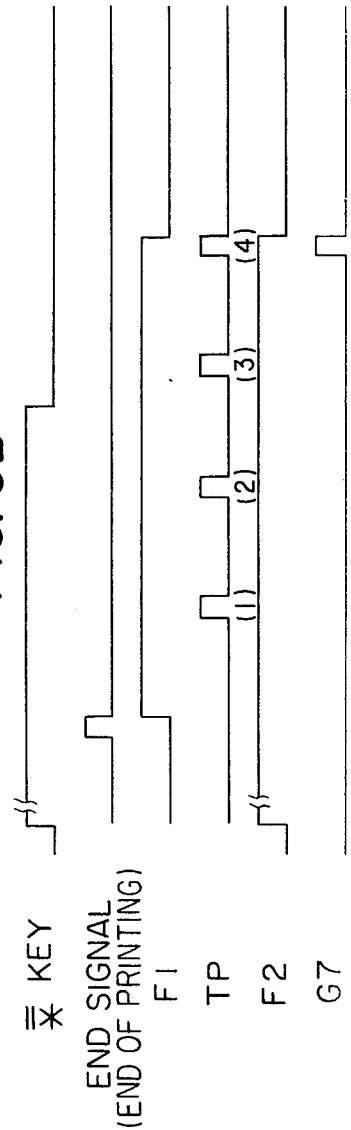

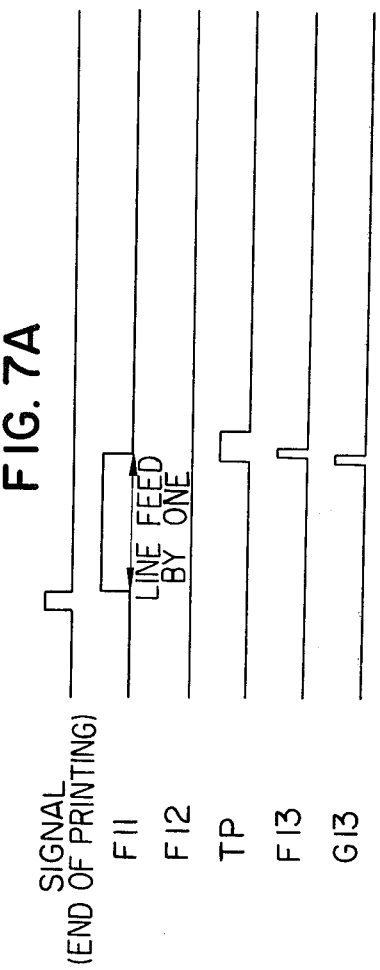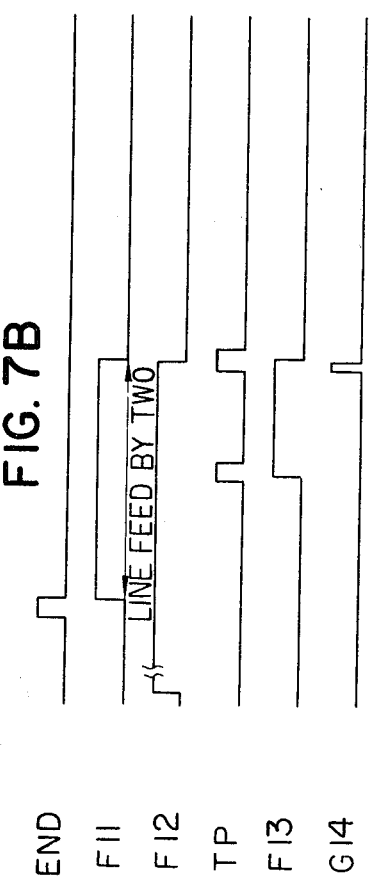

ELECTRONIC CALCULATOR WITH PRINTER

BACKGROUND OF THE INVENTION

1. Field of the Invention

This invention relates to improvements in electronic calculators having a printer, and more particularly to such calculators which are markedly improved in operability, easiness of use and economy.

2. Description of the Prior Art

In the conventional calculator systems, in order to cut off the recording paper, it was necessary to bring the paper over to the position of the paper cutter as shown in FIG. 1 by operating a specific paper feed key PF. This necessitated a shift of finger contact from the operation execution instructing key and/or other keys to the key PF, and such requirement was an impediment to improvement of operability of the calculator system.

Also, in the conventional system, in order to stop the feed of paper at a desired point, the operator must release his finger hold on the key PF at a proper time by determining the feed with his own judgement. Therefore, wasteful feed would be made, and also skill was required for stopping the paper feed at the desired point.

Another serious defect of the conventional systems is that space feed of one line below the numerical sign "369.*" as shown in FIG. 2a would be made almost without exception, because there was provided no means capable of automatically or manually controlling feed for eliminating such space feed (see FIG. 2b). For lack of such means, the conventional systems could not overcome the problem of waste of paper when calculation and/or printing continues extensively and the difficulty involved in handling the lengthy printing paper. Still another and a most serious defect is that since the space feed time is absolutely required when the calculator is operated over a certain fixed period of time, it may follow that the printing speed can no longer cover the key operating speed, making it unable to perform operation or printing any longer. In order to overcome such problem, it has been attempted to inhibit key input when the calculator is performing an operation or printing, or to temporarily store the key signal in a memory (see FIG. 3A). However, if the operation is continued to an extent that exceeds memory capacity, there would inevitably come a situation where operation or printing is no longer possible to carry on. In order to allow the operation to follow the rapid key touching pattern such as shown in FIG. 3B, it is best to eliminate any space feed.

SUMMARY OF THE INVENTION

The primary object of the present invention, therefore, is to provide an improved electronic calculator with a printer which is free of the above-said defects of the conventional systems.

Another object of the present invention is to provide an electronic calculator with a printer of the said type which is greatly improved in its operability, handiness, economy and high speed performance.

Still another object of the present invention is to provide a calculator with improved operability which is capable of feeding any desired number of lines of a recording medium by keeping depressed the operation execution instruction key.

Still another object of the present invention is to provide a calculator wherein the feeding of the recording medium by one-touch operation of the instruction key can be previously set at more than three-lines feed.

A further object of the present invention is to provide a calculator wherein the feeding of the recording medium can be automatically stopped when a predetermined amount of recording medium has been fed by continuous pushed-down key operation.

It is still another object of the present invention to provide a calculator which is capable of automatically or artificially eliminating space feed of the recording medium.

Other objects and advantages of the present invention will become apparent as the following detailed description of the invention proceeds.

The invention is now described in detail with reference to the accompanying drawings.

BRIEF DESCRIPTION OF THE DRAWINGS

For convenience of discussion of the present invention, the accompanying drawings are first described briefly.

FIGS. 3A and 3B are diagrammatic drawings showing the operation patterns for normal printing and rapid key touching;

FIG. 4 is a block diagram showing an embodiment of the present invention;

FIGS. 5A and 5B are timing charts illustrating the operation of said embodiment of the present invention;

FIGS. 7A and 7B are time charts illustrating the operation of the other embodiment of the present invention.

DESCRIPTION OF THE PREFERRED EMBODIMENT

Figure 1:
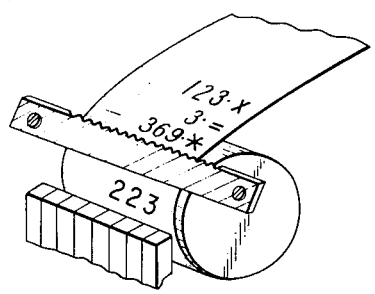
FIG. 1 is the printing section of the calculator showing emphatically the paper cutter unit.

Referring to FIG. 4, there is shown a block diagram illustrating a first embodiment of the present invention. In the drawing, KB designates a key board including numerical keys 0 to 9, operation indication keys such as ×, ÷, +, −, operation execution key, paper feed key PF and paper feed control switches S1 and S2. A is an input circuit including an encoder, B an arithmetic circuit designed to manage data storage and arithmetic operation, C a printing control circuit, and D a printing unit including a paper feeder. These circuits A, B, C and D are all known in the art. E is a paper feed control circuit according to the instant embodiment of the present invention, where flip-flops F1, F2, counter CT, OR gates G1, G3, G5, NAND gate G4, "AND" gates G2, G6, G7, and inverters IN1, IN2 are connected as shown. In such arrangement, when the operation execution key is pushed, a signal is impressed to the input circuit A through a line l1 and arithmetic operation is executed in the arithmetic circuit B. When the arithmetic operation of the known formula is performed and the result is printed, the operation end signal END for effecting a one-line space feed is generated from the control circuit C and passed through the OR gates in the feed control circuit E to set the flip-flop F1. This set output is amplified by an amplification circuit AMP and applied to the printing unit D as a paper feed signal PF to drive the motor or such to carry out the paper feed.

Figure 2A:
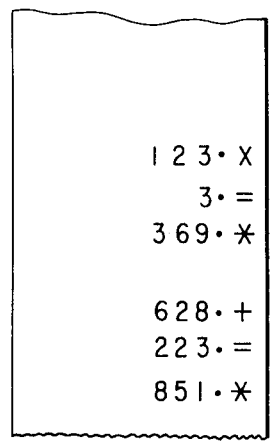
FIGS. 2A and 2B show examples of printing format.

Pulse TP is sent from the printing unit to the control circuit E upon every line feed. In the coventional systems, the flip-flop F1 is reset by the pulse TP to stop the paper feed and the next printing starts from the line below the space line, so that the printing format is such as shown in FIG. 2A. Therefore, the feed that could be effected by depression of the key ⧠ was two lines at most, and for effecting a feed of more lines, the operator must operate the key PF. When feed of the desired quantity has been confirmed, the operator releases his finger hold on the key ⧠, whereby the output of inverter IN1 runs to a high level. During this time, since both of switches S1 and S2 stay off, the output of the NAND gate G4 remains at high level. Therefore, the pulse TP which is generated first after release of the key ⧠ is allowed to pass the AND gate G2, so that flip-flop F1 is reset. The flip-flop F2 is also reset. This condition is shown in FIG. 5A. Paper feed is thus stopped. It is to be noted that as such feed stoppage is effected by the pulse TP issued for each line, the position of stoppage can be always correctly regulated.

As apparent from the foregoing explanation, it is possible according to this embodiment of the invention to perform any desired quantity of feed by keeping the operation execution key ⧠ depressed, without use of the paper feed key PF. Of course, no trouble arises if such key PF is left mounted on the board, in which case the flip-flop F1 is set through the OR gate G1. Also, in such case, since the key ⧠ is not depressed and the switches S1 and S2 remain off, the pulse TP can pass the gate G2 at any time, and hence the flip-flop F1 is reset by the first pulse TP and paper feed is stopped upon the feed of only one line. Therefore, line by line type of feed can be performed upon every push of the key PF, allowing feed of any desired line quantity by pushing the key a corresponding number of times. It is therefore possible to use the operation key exclusively for high-speed large-quantity feed while using the key PF for line by line fine feed. It is however preferred that these keys be constituted from a single unit as said before.

Now the functions of the switches S1, S2 and counter CT are described. As said above, paper feed by the operation of the key ⧠ or PF is stopped by releasing the depression of such keys but, but in many cases, such feed operation depends on eye measurement and hence "overfeed" would often occur to cause waste of paper. In a system equipped with a cutter device as aforementioned, it is most desirable that paper advancement be stopped correctly at the position of cutting. The counter CT and switches S1 and S2 are designed to automatically effectuate stoppage of advancing paper at the correct position. When, for instance, it is desired that paper feed be automatically stopped after feed of just four lines, even if the key ⧠ or PF is left depressed, the switch S2 is kept closed. The output of the OR gate G5 stays at high level, and if the key ⧠ is pushed for effecting paper feed, the flip-flop F2 is set and hence the output of the AND gate G4 remains at low level. As the output of inverter IN1 also stays at low level as said before, the AND gate G2 inhibits passage of the pulse TP. Paper feed is started upon setting of the flip-flop F1 with generation of the END signal by push-down of the key ⧠ as said before. At this time, pulse TP is introduced into the counter CT to effectuate counting, and when four bits of pulse TP have been counted, that is, when a four-line paper feed has been accomplished, the four-bits counting output f2 from the TP counter elevates to a high level. The gate G2 stays closed, but as the AND gate G7 is opened, the flip-flop F1 is reset by the $f2$. It is thus possible to stop paper feed correctly after feed of four lines even if the key ⧠ is left depressed. At the same time, the output of the flip-flop F1 is inverted by inverter IN2 to reset the count CT to restore the original state. This situation is shown in FIG. 5(B). When it is desired to stop feed after two lines, the switch S1 may be closed.

In the case of using the above method of automatically stopping paper feed after feed of a desired number of lines by actuating the switches S1 or S2, there is no need to keep pushing down on a key until feed is completed. That is, the flip-flop F2 memorizes the depression of the key ⧠, and since its set output and the output of OR gate G5 are both at a high level, the output of the NAND gate G4 maintains a low level throughout the period until the flip-flop F2 is reset. It is thus possible to inhibit the pulse TP from passing the gate G2, and to reset the flip-flop F1 by the output of the counter CT only when the desired number of lines has been fed. Therefore, according to this system, paper feed can be automatically stopped upon the end of feed of the number of lines determined by the one-touch operation of the key ⧠, and this can greatly improve operability of the system. It will be apparent that the same operation and effect can be obtained by the use of the key PF, too. It is also possible to employ the key ⊞ which is used when executing the calculation of A + B = in the input order of A ENTER B ⊞ is a so-called "ENTER" system.

As described above, the just described embodiment of the present invention has many advantages such as reduction of the number of key operations and elimination of the key PF. The calculator according to the present invention also has the merit of allowing rapid key input by automatically or artificially omitting space feed as said before. Such merit is further described hereinbelow.

Figure 6:
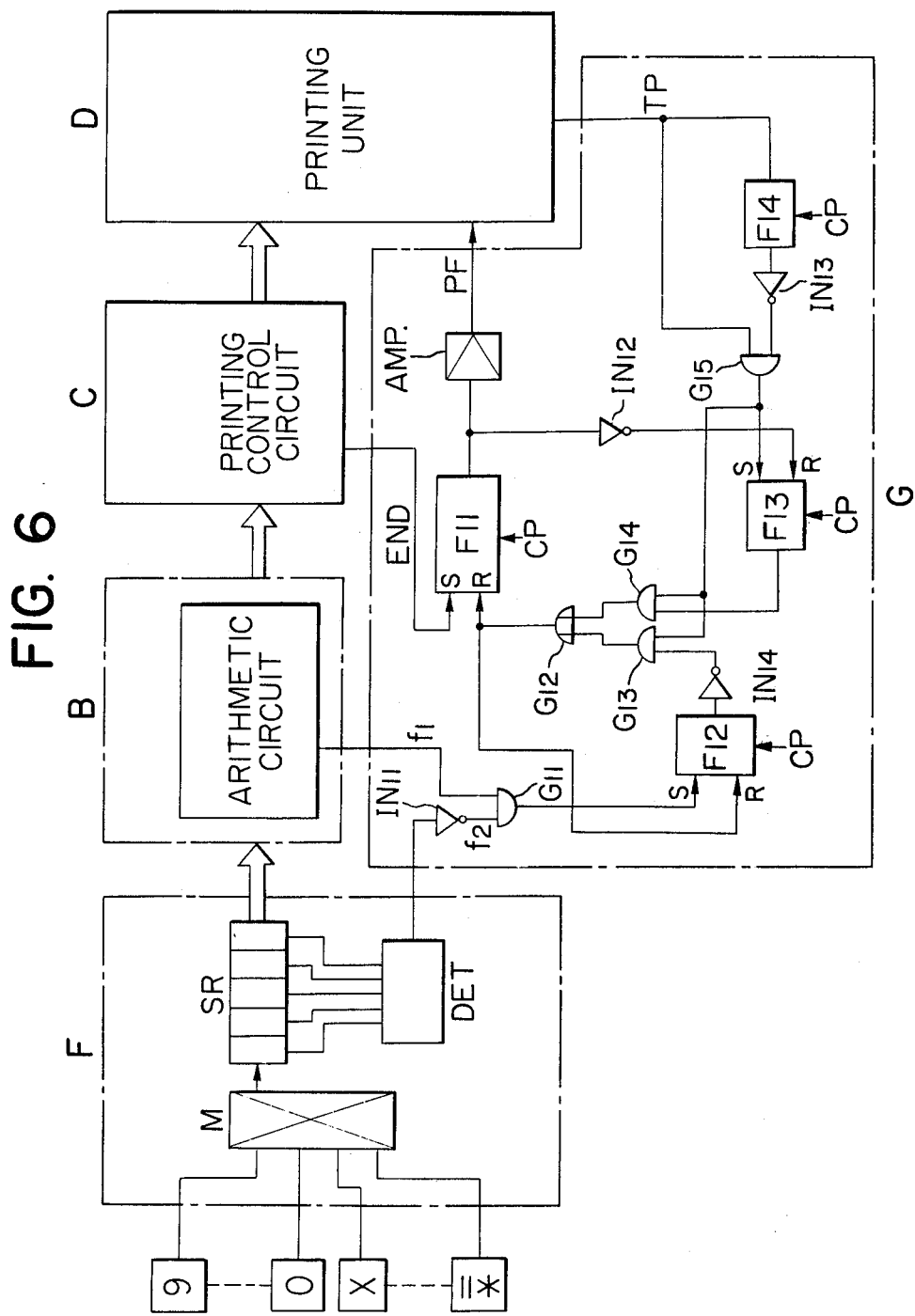
FIG. 6 is a block diagram showing another embodiment of the present invention.

FIG. 6 is a block diagram illustrating a second embodiment of the present invention wherein space feed is automatically eliminated. In the drawing, F designates a key input circuit according to this embodiment of the invention including a key signal encoding circuit M, a register SR for temporarily storing the key signal, and a detection circuit DET for detecting the presence and absence of the key signal in the register SR. B is an arithmetic circuit, C a printing control circuit, and D a printing unit. These circuits function substantially similarly to those in the embodiment of FIG. 4. G designates a feed control circuit according to the instant embodiment of the present invention including flip-flops F11, F12, F13, F14, AND gates G11, G13, G14, G15, OR gate G12, and inverters IN11 - IN14, which are connected as shown.

This embodiment is described as it was adapted for effecting one line feed with reference to FIG. 6 and a timing chart of FIG. 7A.

After completion of printing, an END signal is sent from the printing control circuit C to set the flop-flop F11. This flip-flop F11 is connected to the printing unit D through an amplifier AMP to effect feed such as aforesaid. A timing pulse (TP signal) from the printing unit D returns to the feed control circuit G upon every line feed. This TP signal is shaped into one bit by means of said flip-flop F14, inverter IN13 and AND gate G15 and used for setting of the flip-flop F13 and resetting of the flip-flop F11. As the flip-flop F12 is reset, the first TP signal passes the AND gate G13 to reset the flip-flop F11, thus completing one line feed.

Now the present embodiment of the invention as adapted for performing a two-line feed is described with reference to the timing chart of FIG. 7B.

Figure 2B:
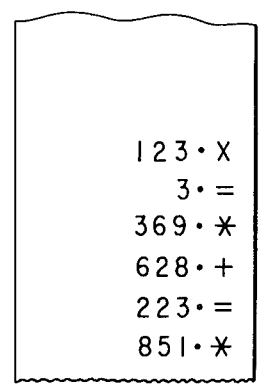
Figure 8:
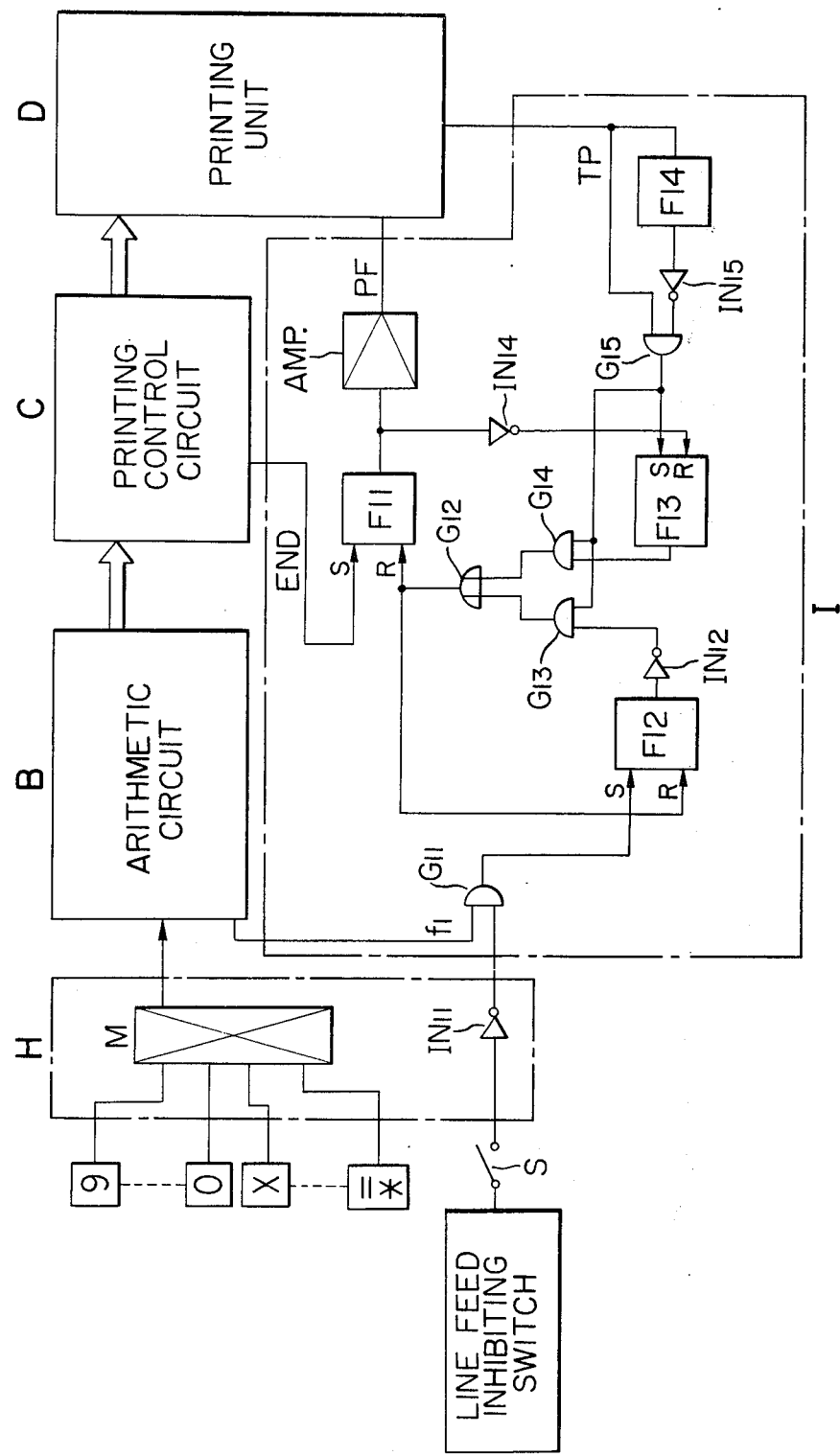
FIG. 8 is a block diagram showing still another embodiment of the present invention.

In case of executing a key operation (for example operation of the key) for effecting two-line feed, a two-line feed signal F1 is issued from the arithmetic circuit B, and if no non-processed key input is present ($f2=1$) in the register SR of the key input circuit F, the AND gate G11 is opened to set the flip-flop F12. When printing is completed and the END signal comes in, the flip-flop F11 is set to start feeding. The TP signal when effecting one-line feed sets the flip-flop F13, but as the flip-flop F12 is set, the flip-flop F11 remains set and feed is continued. But the TP signal when performing two-line feed passes the gate G14 as the flip-flop F13 is set, so that it resets the flip-flop F11 to end feeding. As described above, two-line feed is performed when no non-processed key input is present in the register SR of the key input circuit A, but if non-processed key input is present, the two-line feed signal f1 is inhibited by the signal f2 and hence the flip-flop F12 can not be set, so that one-line feed alone is performed and therefore space feed is eliminated to allow practice of printing such as depicted in FIG. 2B. FIG. 8 shows a system in which the operator can intentionally designate omission of space feed from the very beginning by controlling the operation of a manual switch. In this case, opening and closing of the AND gate G11 is controlled by the manual switch S. The other operations are the same as in the embodiment of FIG. 6.

What is claimed is:

1. Electronic apparatus of the type including a printer for recording information on a recording medium, comprising:

key input means including numerical keys and an operation command key for depression to produce corresponding key signals;

control means coupled to said key input means for controlling data operations and printing by said apparatus in response to the key signals from said key input means; and feed drive means coupled to said operation command key and said control means for feeding the recording medium past said printer wherein the recording medium continues to advance past said printer during depression of said operation command key, and wherein a predetermined length of the recording medium is fed past said printer when depression of said operation command key is discontinued.

2. Electronic apparatus according to claim 1, further comprising selector means coupled to said feed drive means for entering signals operative to select a said predetermined length of the recording medium to be fed past said printer, and wherein said feed drive means includes means for stopping the feeding of the recording medium after said predetermined length of the recording medium is fed past said printer in response to an output from said selector means.

3. Electronic apparatus according to claim 2, wherein said selector means comprises switches for manual actuation to select a said predetermined length.

4. Electronic apparatus of the type including a printer for recording information on a recording medium, comprising:

key input means including numerical keys and an operation command key for depression to produce corresponding key signals;

control means coupled to said key input means for controlling operations and printing by said apparatus in response to the key signals from said key input means; and feed drive means coupled to said operation command key and said control means, said feed drive means including a memory arranged to assume a first state during depression of said operation command key and a second state at a predetermined time after said depression is discontinued, wherein said feed drive means is operative to continuously advance said recording medium past said printer when said memory is in said first state, and to feed a predetermined length of said recording medium past said printer after said depression is discontinued until said memory is in said second state.

5. Electronic apparatus according to claim 4, further comprising selector means coupled to said feed drive means for entering signals operative to select a said predetermined length of the recording medium to be fed past said printer, and wherein said feed drive means includes means for stopping the feeding of the recording medium after said predetermined length of the recording medium is fed past said printer.

6. Electronic apparatus according to claim 5, wherein said selector means comprises switches for manual actuation to select a said predetermined length.

7. Electronic apparatus of the type including a printer for recording information on a recording medium, comprising:

key input means having a plurality of keys for actuation to produce corresponding key signals in response to selective actuation thereof;

storage means coupled to said key input means for storing information in response to the key signals;

means coupled to said printer for feeding at least one predetermined unit length of the recording medium past said printer upon the completion of each printing entry; and means coupled to said storage means and said feeding means for sensing the presence of information stored in said storage means for actuating said feeding means to advance said recording medium a distance corresponding to a multiple of said predetermined unit lengths in the absence of information stored in said storage means.

8. Electronic apparatus according to claim 7, wherein said storage means comprises a register, and said feeding means includes a flip-flop.

9. Electronic apparatus of the type including means for entering data and a printer for recording groups of information corresponding to the entered data on a recording medium, comprising:

means for feeding the recording medium past said printer;

feed control means coupled to said feeding means for driving said feeding means in either one of first and second modes; and a manually actuable switch coupled to said feed control means for selecting one of the two modes wherein a first predetermined length of the recording medium is fed past said printer by said feeding means after information is printed by said printer when the first mode is selected by said switch, and wherein a second predetermined length of the recording medium is fed past said printer by said feeding means after information is printed by said printer when the second mode is selected by said switch.

10. Electronic apparatus according to claim 9, wherein said feeding means comprises a flip-flop.

* * * * *